United States Patent [19]

Hall et al.

[11] Patent Number: 4,747,051
[45] Date of Patent: May 24, 1988

[54] DEVICE FOR MODIFYING TRAVELING SPEED OF A MOTOR VEHICLE

[75] Inventors: Dieter Hall, Schwieberdingen; Albrecht Sieber, Ludwigsburg, both of Fed. Rep. of Germany

[73] Assignee: Robert Bosch GmbH, Stuttgart, Fed. Rep. of Germany

[21] Appl. No.: 835,561

[22] Filed: Mar. 3, 1986

[30] Foreign Application Priority Data

Mar. 21, 1985 [DE] Fed. Rep. of Germany ....... 3510174

[51] Int. Cl.$^4$ ............................................. B60K 31/00
[52] U.S. Cl. ............................... 364/426; 364/431.07; 180/170; 123/352
[58] Field of Search .................... 364/426, 566, 431.07; 180/170, 176–179; 123/351, 352

[56] References Cited

U.S. PATENT DOCUMENTS

| 4,493,303 | 1/1985 | Thompson et al. | 123/352 |
| 4,577,718 | 3/1986 | Ueno | 123/352 |
| 4,591,986 | 5/1986 | Nakajima et al. | 364/426 |
| 4,598,370 | 7/1986 | Nakajima et al. | 364/426 |

Primary Examiner—Gary Chin
Attorney, Agent, or Firm—Michael J. Striker

[57] ABSTRACT

A device for adjusting traveling speed of a motor vehicle includes traveling speed and acceleration PI-regulators cooperating via an operational condition control and a switching device with an electronic fuel metering system of a motor vehicle. The acceleration regulator and the traveling speed regulator are alternately activated in dependency on the selection of desired driving conditions, namely whether a traveling speed is to be reached or maintained. A high driving comfort is obtained by modifying initial and transition states of integral parts of output signals of respective regulators.

7 Claims, 2 Drawing Sheets

DEVICE FOR MODIFYING TRAVELING SPEED OF A MOTOR VEHICLE

BACKGROUND OF THE INVENTION

The present invention relates to a device for affecting or modifying traveling speed of a motor vehicle having a traveling speed regulating means which compares an actual speed signal with a desired speed signal.

From German publication DE-OS No. 2,546,529 a traveling regulating device for a motor vehicle is known. In this prior art device, however, a new desired value for traveling speed suddenly is advanced when acceleration occurs. Since the traveling speed reacts relatively slowly there is the risk of regulating oscillations which may last at least several cycles after reaching the new desired value. In order to reduce such an overswing, the German publication DE-OS No. 2,537,415 teaches a regulator having a PD behavior. Due to different loads and due to variations in play in the linkage of setting member, the regulated speed after setting by such PD or P regulators is inaccurate. If in this case an I regulator is employed then the traveling comfort is impaired.

The German publication DE-OS No. 2,701,567 describes a traveling speed control device for motor vehicles in which the desired acceleration and deceleration can be selectively controlled by an acceleration pedal sensor. This control is achieved by evaluating according to a predetermined function the position of the acceleration pedal determined by the sensor and by using an integrator in the transmission path of the regulator for the traveling speed. The control of specified accelerations in this case is accomplished by regulating the actual speed to a desired or nominal value. This known device however requires an unconventional use of the acceleration pedal sensor and moreover there may result inaccuracies in setting the final speed after acceleration due to the increased reaction of the motor vehicle.

In the German publication DE-OS No. 2,842,023 a traveling speed regulator device for motor vehicles is described in which during acceleration the nominal or desired speed is adjusted to a ramp shaped curve of a nominal or desired speed so that a soft transition to each new end speed follows and accurate value of the end speed is always obtained. Nevertheless, this known device requires relatively expensive digital circuitry. In spite of its digital operation, however, it cannot be readily interfaced with an electronic fuel metering system, particularly it cannot use the existing computer in such a system.

SUMMARY OF THE INVENTION

It is therefore a general object of the present invention to provide a road speed regulator for a motor vehicle which avoids the disadvantages of prior art regulators of this kind.

In particular, it is an object of this invention to provide such an improved road or traveling speed regulation which allows the adjustment and maintenance of a preselected traveling speed at a high traveling comfort. Moreover, it utilizes controlling functions of existing computer in the fuel metering system of the vehicle. Consequently, the construction and installation of the device of this invention is simplified and rendered less expensive in manufacture.

Another object of this invention is to provide such an improved regulation which bypasses the control of traveling speed by means of the foot or acceleration pedal sensor.

In keeping with these objects and others which will become apparent hereafter, one feature of this invention resides in the provision of means for generating an actual acceleration signal in dependency on time behavior of the actual speed signal, means for regulating acceleration of the vehicle in response to a selectable desired acceleration signal, means for controlling the traveling speed regulating means and the acceleration regulating means in dependency on the actual and desired acceleration signals, the controlling means cooperating with an electronic metering system to alternate traveling speed and acceleration regulations in such a manner that before or after actuation of the traveling speed regulating means the acceleration regulating means becomes effective.

The measures of this invention have the advantage that operator of the vehicle can modify all driving conditions of the motor vehicle along with the acceleration by foot pedal at a high driving comfort. In comparison with prior art devices of this kind, an advantageous simplification is achieved by the provision of separate regulators for the traveling speed and for the acceleration which are alternately effective for certain time intervals.

It is of particular advantage when the regulating means includes integrators for the regulated values, the control means controlling the integrated values in dependency on operational conditions of the vehicle by using PI regulator so that transitions between traveling speeds occur softly and without overswings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
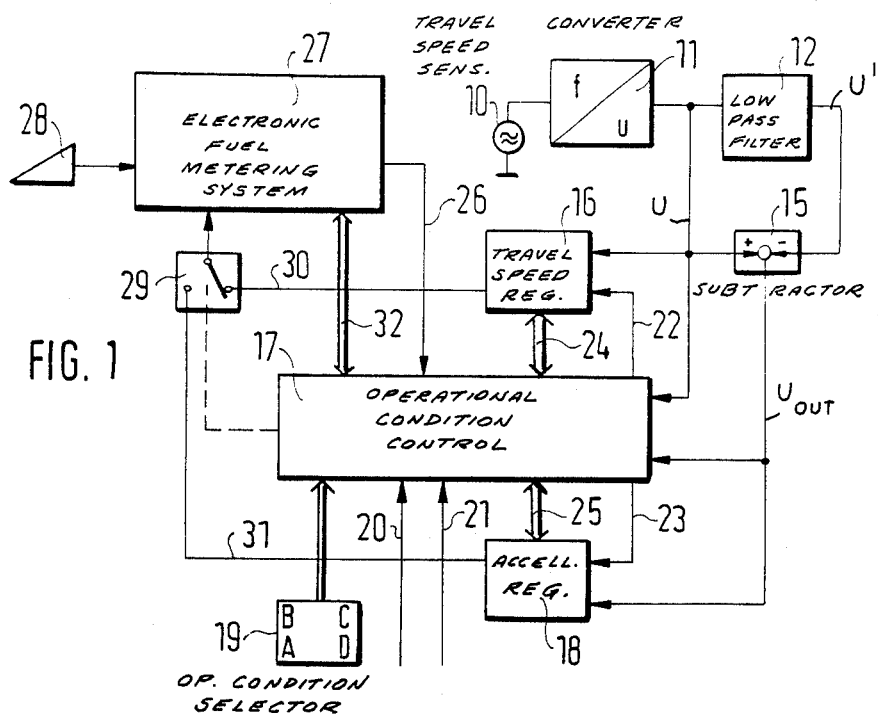
FIG. 1 is a schematic block circuit diagram of the traveling speed regulation according to this invention.

Referring to FIG. 1, a road or traveling speed sensor 10 generates an alternating voltage whose frequency is proportional to traveling speed of a motor vehicle. The signal from the sensor 10 is converted in a frequency/voltage converter 11 into a direct current voltage proportional to the sensed speed. The direct current speed signal U at the output of converter 11 is applied to the input of a low pass filter 12, to an input of a subtractor 15, to an input of a travel speed regulator 16 and to an input of an operational condition controlling device 17.

The output of the low pass filter 12 is connected to a second input of the subtractor 15. The output signal of subtractor 15 represents an acceleration signal $U_o$ which is supplied to another input of the operational condition controlling device 17 and to an input of an acceleration regulator 18. The operational condition controlling device 17 is preset by a condition selector 19 to operate in one of four operational conditions A, B, C and D, and in addition it is controlled by a braking signal 20 and a clutch signal 21. Output conductors 22 and 23 connect the device 17 to second inputs of the traveling speed regulator 16 and of acceleration regulator 18, respectively. The output conductor 22 delivers a desired traveling speed signal and the output conductor 23 delivers a desired acceleration signal. Buses 24 and 25 serve for supplying to the traveling speed regulator 16 and to the acceleration regulator 18 predetermined parameters from the device 17 and also serve for the interchange of regulating signals between the device 17 and the regulators 16 and 18. A switching device 29 is electronically controlled by the operational condition controlling device 17 to deliver an output signal either from the traveling speed regulator 16 or from the acceleration regulator 18 to a computer of an electronic fuel metering system 27. The metering system 27 is controlled by an acceleration pedal sensor 28 and generates at its output which is connected via conductor 26 to an input of the operational condition controlling device 17, a signal representing an amount of metered fuel determined by the position of the acceleration pedal sensor 28. This output signal is being applied to the device 17 until an operational condition A through D is selected on the device 19. Bus 32 represents a bidirectional coupling between the operational condition controlling device 17 and the electronic fuel metering system 27. In practice, the device 17 and the computer of the electronic fuel metering system 27 are united. For the sake of convenience, however, the two functions are illustrated as two separate functional blocks.

Figure 2:
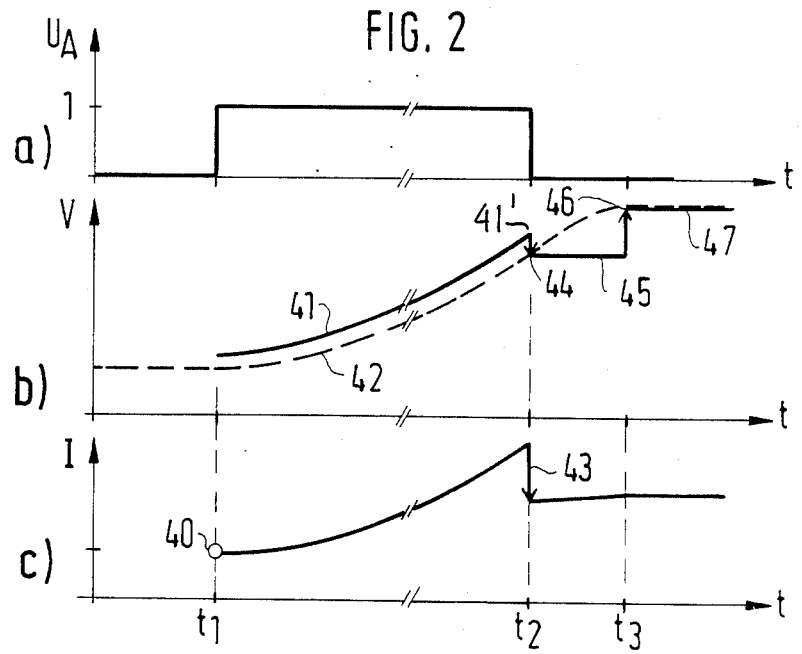
FIG. 2 shows time plots of the course of traveling speed in dependency on a preset or modified integrated value during acceleration.

The operation of the traveling speed regulator according to this invention will be explained with reference to FIGS. 2 through 4. In this example, the condition selector 19 can select acceleration (condition A), deceleration (condition B), resumption (condition C) and off (condition D). If none of these operational conditions is selected by the operator, the electronic fuel metering system 27 determines fuel doses supplied to the engine of the vehicle from the position of the acceleration pedal 28 controlled by the operator of the vehicle and the traveling speed regulation 16 is turned off. In any case the operational condition controlling device 17 is supplied via conductor 26 with an output signal from the fuel metering system 27 which always represents the last dose of fuel metered by the system 27. In addition, the traveling speed regulator 16, the operational condition controlling device 17, the plus input of subtractor 15 and the input of low pass filter 12 are supplied with a traveling speed signal U from the converter 11. A delayed traveling speed signal U' at the output of low pass filter 12 is applied to the minus input of the subtractor 15 which by comparing the nondelayed traveling speed signal U with the delayed one creates a difference signal $U_{out}$ which approximates the actual acceleration. The acceleration signal $U_{out}$ is applied to the acceleration regulator 18 and to one input of the condition controlling device 17. The second input of regulator 18, as mentioned before, is supplied with the desired acceleration signal generated in the device 17.

Regulators 16 and 18 are constructed as PI regulators whose regulating characteristic is defined by the formula $$Y = I + P = K_I \times_D dt + K_P \times_D$$

wherein $x_D$ is regulating deviation, $K_I$ and $K_p$ are constants which are determined experimentally for each vehicle, and Y is regulating magnitude or signal; the regulating magnitude Y thus consists of an integral or integrated component I and a proportional component P.

When the operator desires to accelerate the vehicle, then he or she manipulates at a time point $t_1$ the condition selector 19 into the operational condition A whereby the selector 19 delivers a selector signal $U_A$ (FIG. 2a) to the condition control device 17. This signal triggers the setting of the integral part I of the output signal of acceleration regulator 18 to an initial value 40 (FIG. 2c) corresponding to a fuel dose characterizing signal delivered through conductor 26, that means to the fuel metering immediately before the selection of the operational condition A. Simultaneously, the condition control unit 17 delivers via conductor 23 the desired acceleration signal to the second input of acceleration regulator 18. Moreover, the condition control device 17 activates the switching device 29 to a position in which the integral part I of the output signal of acceleration regulator 18 controls via conduit 31 the electronic fuel metering system 27. Due to the above described measures it is achieved that the acceleration of the vehicle is regulated without any jump in the amount of the metered fuel. Due to the desired acceleration signal supplied via conductors 23 to the acceleration regulator 18, the course of the desired or nominal traveling speed 41 exceeds the course of the actual traveling speed 42 (FIG. 2b).

If the operator desires to terminate the acceleration of the motor vehicle that means if it is desired to maintain a constant road speed, then at a time point $t_2$ he or she terminates the switching condition A on the selector 19 whereupon the signal $U_A$ drops to zero. The zero value of the signal $U_A$ first resets via device 17 the integral part I of the output signal of traveling speed regulator 16 to an initial value 41' corresponding to a fuel dose immediately before the cancellation of the operational condition A. This initial value is slightly diminished by an abrupt decrease of the fuel dose corresponding to the step 43 (FIG. 2c) which is proportional to the sensed actual acceleration before the disconnection of the operational condition A. At the same time, the condition controlling device 17 stores the sensed momentary actual traveling speed 44, sets the traveling speed regulator 16 to deliver nominal transition speed signal 45 and activates the switching device 29 into the illustrated position in which the output signal of the traveling speed regulator 16 is fed via conductor 30 into the fuel metering system 27. While the traveling speed regulator 16 is switched on, the acceleration regulator 18 is switched off. The operational condition controlling device 17 monitors the course of the actual traveling speed 42 by evaluating the acceleration signal $U_{out}$ from subtractor 15. If the acceleration signal $U_{out}$ at a time point $t_3$ equals zero, then the nominal transition speed signal 45 generated at the output of regulator 16 is immediately increased to a value 46 corresponding to the actual traveling speed and the vehicle is regulated toward the new desired or nominal traveling speed value 47. Since the switchover between the regulators 18 and 16 occurs at a time point ($t_2$) at which the acceleration has been set practically to zero, it is guaranteed that the vehicle reaches the desired end speed without jerks and overswings value of the new. The nominal traveling speed 47 is stored in the operational condition controlling device 17.

Figure 3:
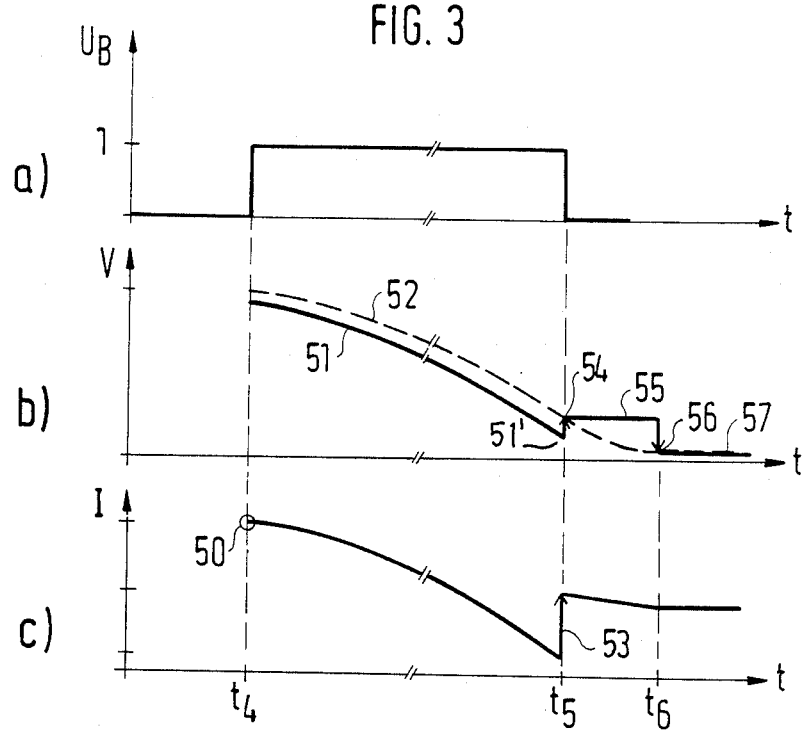
FIG. 3 illustrates time plots of the course of the traveling speed in dependency on a preset or modified integrated value during deceleration.

If the operator desires a deceleration of the vehicle then at a time point $t_4$ in FIG. 3 the condition selector 19 is set to operational condition B (deceleration) whereby a signal $U_B$ (FIG. 3a) is delivered to the condition controlling device 17. The signal $U_B$ set via the device 17 the integral part I of the output signal of acceleration regulator 18 to an initial value 50 (FIG. 3c) corresponding to the dose of fuel immediately before the selection of the operational condition B. If in the preceding operational phase the rate of traveling speed of the vehicle had been regulated then the integral part I of the output signal of traveling speed regulator 16 can be duplicated in the acceleration regulator 18. Simultaneously the regulator 18 is supplied via signal path 23 from the condition controlling device 17 with a desired deceleration signal which preferably has a constant value which is not identical with the corresponding signal occurring during acceleration. In addition, the device 17 activates the switching device 29 into a position in which the output signal of the acceleration regulator 18 is connected via conductor 31 to the fuel metering system 27. In this manner it is achieved that a regulated deceleration of the vehicle is initiated without any jump in the amount of metered fuel. The course of the desired traveling speed 51 (FIG. 3b) in this mode of operation due to the deceleration signal generated at the output of acceleration regulator 18, is below the course of the actual rotary speed 52.

If the operator desires to terminate the deceleration of the vehicle, namely if it is desired to maintain a constant traveling speed, then at a time point $t_5$ according to FIG. 3, selector 19 is operated to cancel the selection of operational condition B (deceleration) whereby the signal $U_B$ is reset to zero. The zero value of the signal in turn resets the integral part I of the output signal of traveling speed regulator 16 to an initial value 51' correspnding to the fuel dose signal immediately before the cancellation of the operational mode B. The initial value is immediately increased by an abrupt increase of fuel dose corresponding to a value 53 (FIG. 3c) which is proportional to the sensed deceleration immediately before the cancellation of the operational mode B. The condition controlling device 17 stores the simultaneously sensed actual traveling speed value 54 and sets the traveling speed regulator 16 to deliver a new desired transition speed value 55 which is applied via output conductor 30 and switching device 29 to fuel metering system 27 whereby the traveling speed regulator 16 is switched on and the acceleration regulator 18 is switched off. The condition control device 17 monitors the course of the speed decrease 52 by evaluating the actual deceleration signal $U_{out}$. If the latter signal at a time point $t_6$ drops to zero, then the desired transition speed signal 55 at the output of traveling speed regulator 16 is substituted by the actual speed signal value 56 and the vehicle is regulated toward the latter by the final desired speed signal 57. These measures guarantee that the vehicle is decelerated to a desired end speed without the jerks and without overswings in the regulation. The final desired speed value 57 is stored by the device 17 whereby if desired the previously stored desired speed value 47 can be erased.

If the condition controlling device during the regulation of the traveling speed of the vehicle is controlled by a braking signal 20 or by a clutch signal 21 the fuel metering system 27 is set by signals delivered through bus 32 in such a manner that the fuel metering is no longer controlled by the switching device 29 but by the acceleration pedal sensor 28, that means the traveling speed regulation is interrupted.

Figure 4:
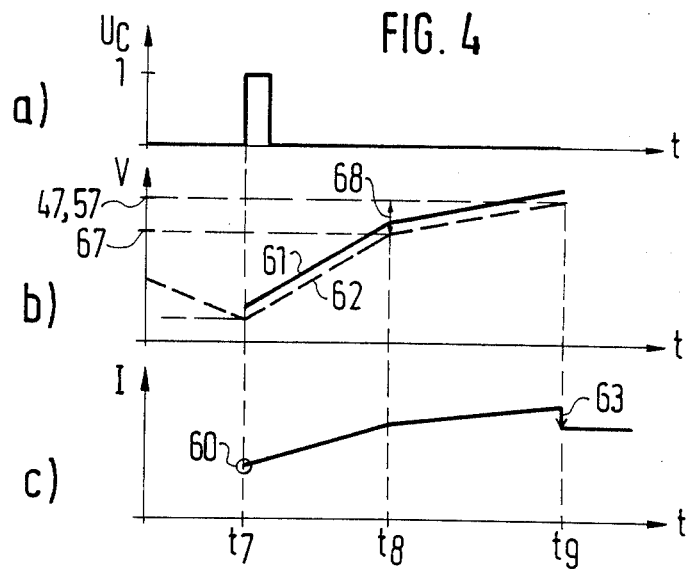
FIG. 4 illustrates time plots of the course or traveling speed in dependency on a preset or modified integral value during restoration of a traveling speed present before deceleration.

If the operator wishes to resume the preceding traveling speed then he or she selects at a time point $t_7$ according to FIG. 4 the operational condition C on selector 19 whereby the latter generates a pulse $U_C$ and supplies the same to the condition controlling device 17. The pulse $U_C$ resets the integral part I of the output signal of acceleration regulator 18 to the initial value 60 (FIG. 4c) corresponding to a mean value of the metered fuel during the last foot pedal driving phase; this mean value is processed by the fuel metering system 27 and applied via conductor 26 to the device 17. Thereafter the acceleration regulator 18 is supplied via conductor 23 with a fixed and increased value of the desired acceleration, the switching device 29 is activated such that output of regulator 18 is connected via conductor 31 to the fuel metering system 27 and the acceleration regulator 18 is turned on. In this manner the regulated acceleration of the vehicle is introduced with minimum jumps in the quantity of metered fuel. Due to the nominal or desired acceleration signal supplied via conductor 23 to the acceleration regulator 18 the curve of desired speed 61 runs above the actual speed signal 62. As soon as at time point $t_8$ the traveling speed reaches a value 67 which is less by the amount 68 than the previously stored desired speed values 47, 57, then the acceleration regulator 18 is supplied with a second fixed desired acceleration signal of lower value which at the time interval $t_9$ is identical with the stored desired speed values 47, 57. This signal resets first the integral part I of the output signal of traveling speed regulator 16 to an initial value which corresponds to the fuel dose immediately before reaching the final speed. The initial value is reduced by an amount 63 which is proportional to the sensed acceleration immediately before the reaching of the final speed. Upon actuation of switching device 29 which connects the conductor 30 from the output of the speed regulator 16 to the fuel metering system 27, the traveling speed regulator 16 is switched on and regulated for maintaining the final speed whereby a signal corresponding to the stored nominal speed value 47, 57 is applied to the traveling speed regulator 16 by conductor 22.

The operator of the vehicle can turn off the traveling speed regulation by selecting operational condition D (off) on the selector 19. In doing so the vehicle is decelerated analogous to the selected condition B by a generated fixed deceleration signal of lower value until a braking signal 20 or clutch signal 21 turns off the regulation or until another operational mode of the regulation is selected. The operational condition D can be also reached automatically when during the traveling speed regulation the actual speed drops by a preset amount which is proportional to the desired speed.

Buses 24 and 25 serve primarily for setting or reading the integral parts of output signals of the regulators by means of the device 17. The above described manipulation of the integral parts of the output signals of the regulators can be performed either by the condition controlling device 17 of the computer in the electronic fuel metering system 27 which can be also combined with the device 17. The regulators 16 and 18 can be supplied via buses 24 and 25 with alternative sets of parameters and regulating constants when various operational conditions require differently matched regulating behavior. The functional units 16, 17, 18, 27 and 29 which in this example have been explained by way of discreet hardware components can be constructed as an integrated circuit or their functions can be performed by a computer by suitable algorithms in the software.

The regulation modifying device of this invention can be advantageously employed in connection with a diesel engine or an Otto carburetor engine whereby in the latter case at least in the transition ranges of device of this invention additionally affects the ignition.

While the invention has been illustrated and described as embodied in specific examples of modification of the traveling speed of a motor vehicle, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for modifying traveling speed of a vehicle having an electronic fuel metering system, comprising a traveling speed regulator having one input for a desired traveling speed signal, another input for an actual traveling speed signal and an output delivering a traveling speed regulating signal; an acceleration/deceleration regulator having one input for a desired acceleration/deceleration signal; another input for actual acceleration/deceleration signal and an output for delivering acceleration/deceleration regulating signal; means for generating said actual traveling speed signal; means for generating said acceleration/deceleration signal; means for controlling operational condition of the vehicle; a condition selector activated by the operator of the vehicle to apply to said controlling means a selection signal for setting a desired acceleration or deceleration operational mode; switching means controlled by said controlling means for switching-on either a traveling speed regulation or an acceleration/deceleration regulation by applying to said fuel metering system said traveling speed regulating signal or said acceleration/deceleration regulating signal; said fuel metering system delivering to said controlling means a fuel dose signal corresponding to an amount of metered fuel; said controlling means delivering to said one input of the traveling speed regulator said desired traveling speed signal and to said one input of the acceleration/deceleration regulator said desired acceleration/deceleration signal; and said controlling means switching-on said acceleration/deceleration regulation in response to said selection signal and setting a first initial value of said acceleration/deceleration regulating signal in dependency of said fuel dose signal and, upon cancellation of said selection signal, said controlling means switching-on said traveling speed regulation and simultaneously applying to said traveling speed regulator a new desired traveling speed signal corresponding to the actual traveling speed signal at the time point of the cancellation of said selection signal, and when at the end of a transition interval in which the rate of the actual acceleration/deceleration signal has approximately reached zero, setting the desired traveling speed signal to a value of the actual traveling speed signal at the end of the transition interval.

2. A device as defined in claim 1 wherein said traveling speed and acceleration/deceleration regulators are PI-regulators each delivering to said switching means the integral (I) part of its regulating signal.

3. A device as defined in claim 2, wherein at least the integral part of said traveling speed regulating signal is controlled during transition from the acceleration regulation to the traveling speed regulation.

4. A device as defined in claim 3, wherein the same integral part is used both for the traveling speed regulation and for the acceleration regulation during time intervals allotted to respective regulations.

5. A device as defined in claim 4, wherein at the end of an acceleration or deceleration regulation the corresponding momentary actual speed is employed as a desired transition value for the traveling speed regulation.

6. A device as defined in claim 5, wherein for the traveling speed regulation a permanent desired speed value is employed corresponding to a speed at which the actual acceleration drops below a preset value or is equal to zero.

7. A device as defined in claim 5, wherein in order to reach a preset end value of the traveling speed said acceleration/deceleration regulator is first supplied with a first desired acceleration value and subsequently supplied with a second acceleration value which is less than the first one whereby the exchange of said first and second desired acceleration values occurs when the momentary actual traveling speed falls by a preset amount below the desired end speed value.

* * * * *